March 30, 1965  P. CIBIÉ  3,176,124
DIPPED HEADLAMPS FOR MOTOR VEHICLES
Filed Dec. 18, 1962  6 Sheets-Sheet 4
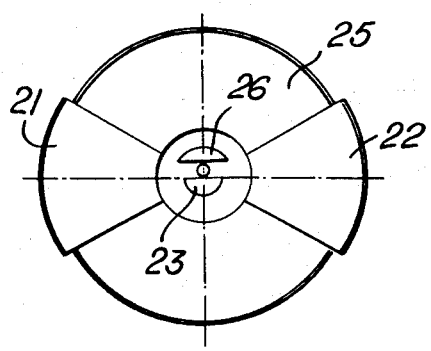
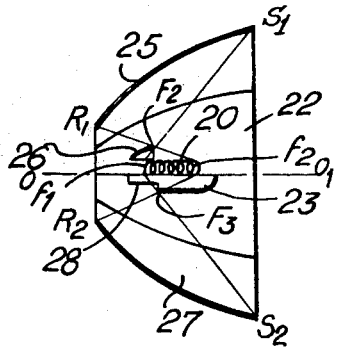
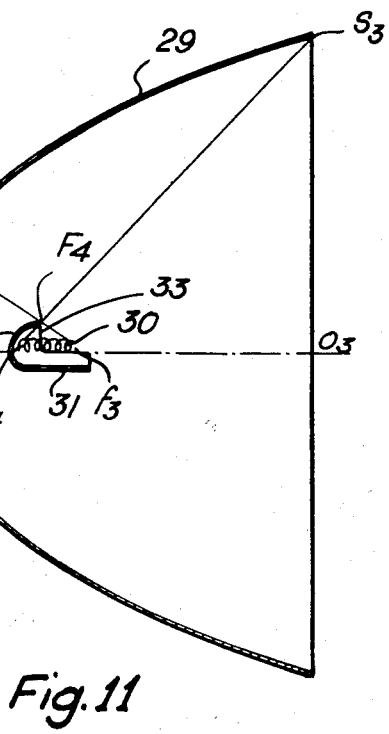

March 30, 1965  P. CIBIÉ  3,176,124
DIPPED HEADLAMPS FOR MOTOR VEHICLES
Filed Dec. 18, 1962  6 Sheets-Sheet 5

March 30, 1965 P. CIBIÉ 3,176,124
DIPPED HEADLAMPS FOR MOTOR VEHICLES
Filed Dec. 18, 1962 6 Sheets-Sheet 6
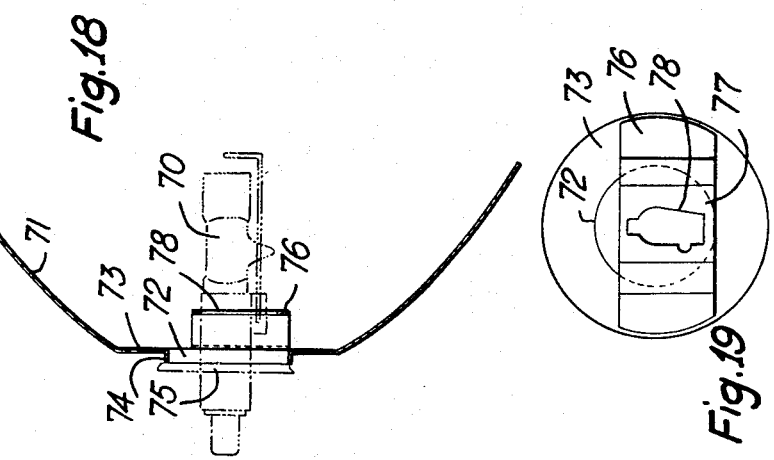
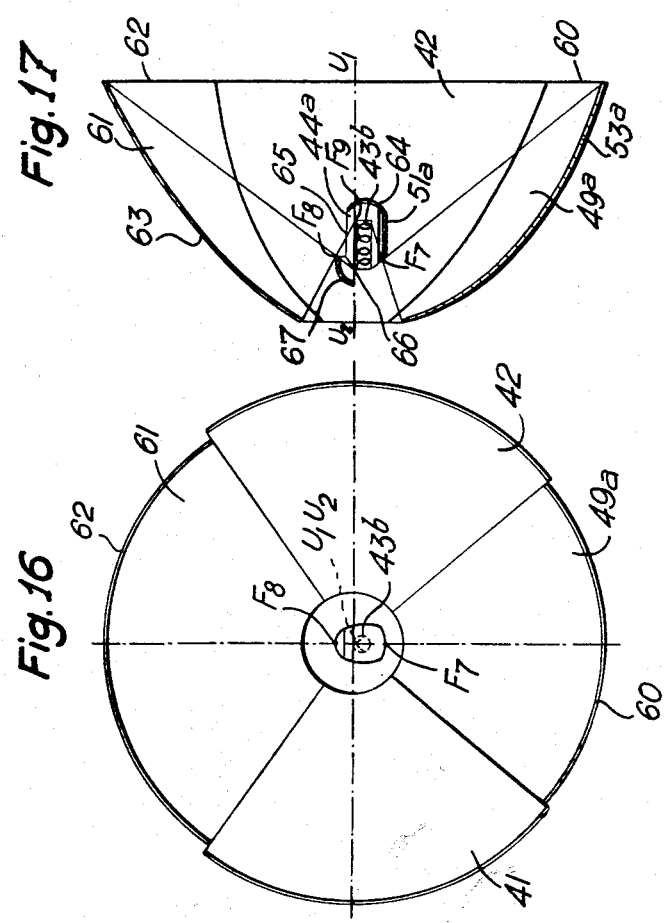

3,176,124
DIPPED HEADLAMPS FOR MOTOR VEHICLES
Pierre Cibié, 159 Ave. de Wagram, Paris 17, France
Filed Dec. 18, 1962, Ser. No. 245,529
Claims priority, application France, Jan. 8, 1962, 884,158;
Feb. 13, 1962, 887,818; Apr. 7, 1962, 893,717
15 Claims. (Cl. 240—41.35)

The obtainment of a clear-cut boundary line across the beam from a projector, i.e. a sharp boundary line between light and shadow, is extremely intricate, and the accuracy of manufacture attained in the industry, though satisfactory, cannot prevent certain parasite phenomena. The diffraction which takes place at the edges of the occultation screens and the light emitted by images of the light source on reflecting or semi-reflecting surfaces, which are inevitable in conventional forms of construction, result in the production of light of varying degrees of intensity which spreads over the shadow side of the boundary line to a varying extent.

It is the main object of this invention to overcome drawbacks of this kind in a projector having a boundary line and more particularly in projectors of the type used as dipped headlamps on motor vehicles.

The present invention accordingly has for its object to provide a headlamp the mirror of which is composed of two surfaces of revolution with homofocal parabolic generating lines, of which the distinct, parallel or concurrent revolution axes, which may be coplanar or not, each contains an edge of a screen for partly occulting a light source.

Said light source, which customarily consists of a cylindrical element of small diameter and small length, or the spiral element of an incandescent bulb for instance, can be placed above the common focal point, opposite the screen and substantially perpendicularly to the plane of the axes of revolution.

Such a source can alternatively be placed in said plane in such manner as to be tangential thereto and to be located on the side opposite to the screen, the extremity of said source being positioned at the focal point and the source as a whole being positioned on that side of said focal point which is remote from the well of the mirror, i.e., between said focal point and the aperture of the mirror.

These various dispositions improve the sharpness of the boundary line.

In order to blank off the parasite light liable to reach the shadow side of the boundary line, in accordance with the present invention there are associated to said screen two complementary masks which are external to said screen and form two parallel strips equally spaced from the axes of revolution, said strips being located on a same side of the plane containing said axes and having one of their edges lying each in a plane which is tangential to the upper part of said light source and which contains a corresponding edge of the screen.

These masks are more particularly intended to stop the rays issuing from the images, produced in the lower part of the mirror, of secondary sources resulting from reflections and refractions off and through the glass bulb of the electric lamp or the support of the incandescent filament, for instance.

In addition, the reflector has its illuminated part cut off or rendered non-reflecting above a certain limiting depthwise angle of aperture, in order to suppress such filament images as would otherwise be located on the shadow side of the boundary line over this blanked-off area.

Since the lower portion of the mirror, namely that which is located beneath the screen, is not used it can also be blanked off so as to provide a mirror of substantially rectangular aperture.

In the upper suppressed or non-reflecting area of the large mirror, there may be disposed a small recuperating mirror which is so designed that its focal point be located above and somewhat rearwardly of the filament, i.e., on that side of the plane containing the axis of revolution which is remote from that occupied by the screen.

Such a recuperating mirror forms part of a surface of revolution obtained by the rotation about the filament axis of a parabolic generating line, and its focal point will therefore not be located on said axis.

Said recuperating mirror is supplemented by a screen positioned above and rearwardly of the light source, the forward edge of said screen being located at said focal point.

This optical recovery system, which is generated by a rotation about the filament axis, lets through only useful light projected on one side of the boundary line.

An optical recovery system of like nature can also be provided in the lower free part of the large mirror and would similarly comprise a recovery mirror and a screen, this second recovery mirror being positioned opposite an aperture embodied in the aforementioned main screen.

In the case of this second recovery mirror, which is obtained by the rotation of a parabola about the light source axis, the focal point is located beneath and forwardly of the front section of the source and the associated screen substantially in the front part of the headlamp, the rear edge of said screen being located at said focal point.

In certain alternative embodiments, particularly in those for obtaining an asymmetric lighting of the so-called "European dipped beam" type for example, one of the marginal edges of the screen can have at least part of its length extended below a horizontal cut-off plane, and the corresponding axis of revolution can be dropped correlatively in order to retain the desired coincidence.

In yet other alternative embodiments, the axes of revolution may or not be coplanar.

With a view to allowing for a headlamp construction with a substantially circular aperture adaptable to conventional fittings and providing a sharp boundary as well as more efficient lighting, it is possible to associate, to the lateral sectors forming the principal reflector, an upper recuperating mirror extending up to the aperture of said lateral sectors and a lower auxiliary recuperating mirror of same definition as the upper recuperating mirror that has an axis of revolution common therewith and identical with the lower generating line of the light source and that is illuminated through a window embodied in the rear portion of the light source occulting screen.

In accordance with an alternative method of construction, the reflector is formed by a single surface of revolution which is described by a parabolic generator lying in a plane perpendicular to the cut-off surface and having its focal point located above the rear part of the light source, is limited by radii passing through said focal point and emanating respectively from the rear and forward parts of said source, and is obtained by rotation about an axis passing through the lowermost generating line of said source.

The headlamps as hereinbefore described are of the type wherein the light rays issuing from the reflecting system are convergent, but it is alternatively possible to provide for divergent rays, namely to so position the light source within the reflecting system that a divergent beam be obtained after reflection thereoff.

Accordingly, the mutual disposition of the mirrors, screens and filaments can be reversed in relation to the cut-off plane and to the focus of the parabolic generating line contained in the said cut-off surface of said principal mirrors.

The invention further relates to a combination of means whereby there are associated, to the filament and mirrors of such headlamps, mobile masks and screens adapted to be retractable by any convenient method and more particularly by two methods which are described in French Patent Number 1,296,036, filed on 4th of May 1961, and entitled "Headlamp with double beams utilizing an axial source of light," in order to allow for obtaining a main headlight or a dipped beam, as desired.

In accordance with this invention, the screens and masks used to obtain a cut-off beam can be mounted within an electric bulb, in association for instance with a first dipped beam filament, and said bulb can if desired comprise a second main headlight filament, as is the practice with currently manufactured lamps.

The aforesaid dispositions further include such screen and mask arrangements as provide a cut-off beam with light rays raised on one side of the cut-off plane, in compliance with the norms defining dipped beams on motor vehicles and known as the "European dipped beams."

The present invention finally has for its object a guiding device for introducing a lamp into a headlamp as hereinbefore designed, said device so mating with the profile of the lamp and of the accessories rigid therewith that it prevents introduction of the same into the headlamp shell from accidentally warping or otherwise damaging the screens or masks disposed and retained within the reflector.

By resorting to the above dispositions, it is possible without unduly complicating manufacture to obtain cut-off type headlamps and more particularly headlamps providing an efficient dipped beam and conveniently shaped for housing in a motor vehicle body, the cut-off line being devoid of parasite illumination above it.

The description which follows with reference to the accompanying drawings, which are filed by way of example only and not of limitation will give a clear understanding of how the invention can be carried into practice.

In the drawings filed herewith:

FIG. 9 is a smaller-scale front elevation view corresponding to FIG. 8.

FIG. 10 shows, in similar fashion to FIG. 9, a section of said reflector taken through a plane at right angles to the cut-off surface.

FIG. 11 is a larger-scale sectional view of an alternative embodiment, taken through a plane at right angles to the cut-off surface.

FIG. 16 is a schematic front elevation view of the arrangement used for a light source, screens, main mirrors and recuperating mirrors within the reflector of a divergently adjusted headlamp, said reflector having a substantially circular aperture.

FIG. 17 is a section of the headlamp of FIG. 16, taken through a plane perpendicular to the cut-off surface.

FIG. 18 is a fragmentary sectional view of the disposition, at the well of such a headlamp, of a lamp-holder and a guide for introducing the lamp.

FIG. 19 is a schematic front elevation view of said headlamp well portion.

Figure 1:
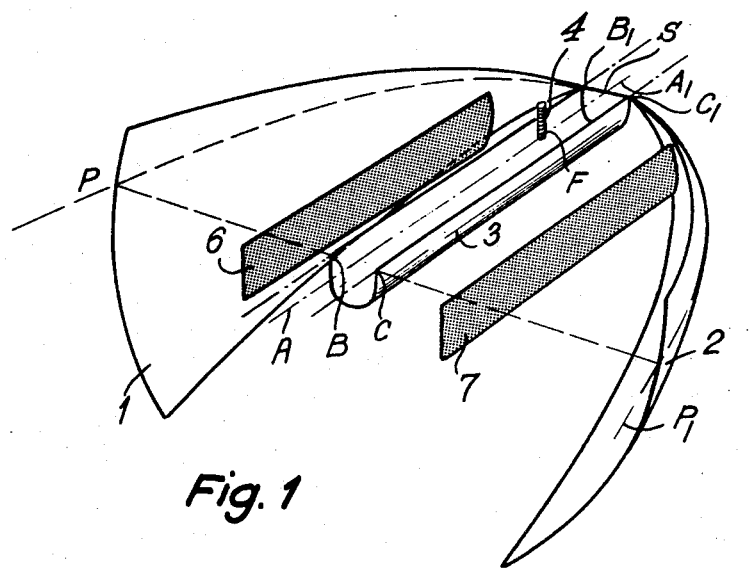
FIG. 1 is a diagrammatic perspective view of a first embodiment of a headlamp with cut-off beam in accordance with the invention.

Referring firstly to FIG. 1, there is shown thereon a cut-off type headlamp consisting of two surfaces of revolution 1 and 2 the parabolic generating lines SP and $SP_1$ which have a common focus F and as their axis a straight line $AA_1$. The axis of revolution of the lefthand portion 1 of such a mirror is a straight line $BB_1$ and the axis of revolution of the righthand portion 2 of the mirror is a straight line $CC_1$.

In the example illustrated, straight lines $BB_1$, $AA_1$ and $CC_1$ are parallel and lie in the same plane on which the generating lines SP and $SP_1$ are drawn, which lines may if desired constitute a single parabola thereon. A screen 3 is adapted to occult a portion of the light flux in order that the mirror produce a dipped beam when mounted on a motor vehicle. Said screen is formed by a semi-cylindrical channel section having straight generating lines and an approximately semi-circular base. The edges of said screen are very precisely bounded by the aforesaid straight line segments $BB_1$ and $CC_1$.

As can be clearly seen from FIG. 1, the light source may consist of the spiral filament 4 of an incandescent bulb or can be formed by any other convenient and similarly shaped means located with one axis perpendicular to the plane containing the screen edges and on that side of said plane which is opposite said screen, that is to say above the common focal point F in the case of a dipped beam headlamp. In such cases, the plane containing the edges of the screen will constitute a substantially horizontal plane.

Figure 2:
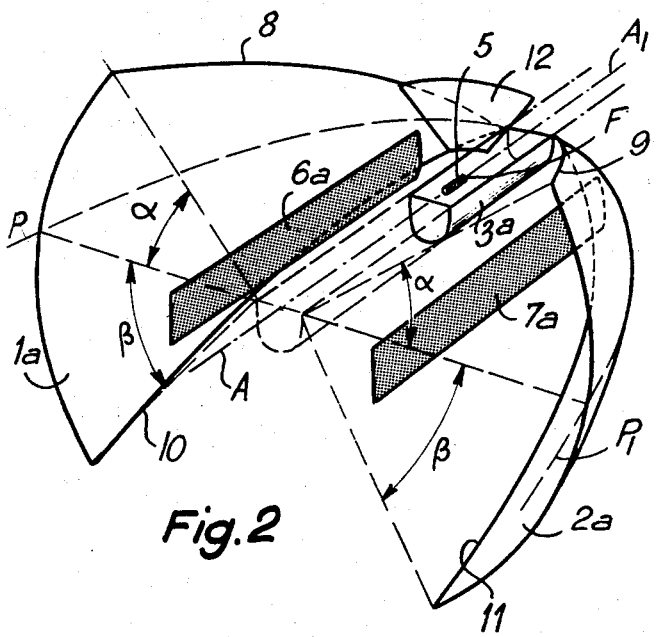
FIG. 2 is an alternative embodiment thereof.

Such a reflector can furthermore contain, as may be seen in FIG. 2, a light source 5 formed by a cylindrical element of small diameter and small length, the spiral element of an incandescent lamp, or a source of like configuration but which is in all cases arranged along the axis $AA_1$ with one straight generating line tangential thereto, and with one extremity positioned very close to the common focal point F and the other extremity located near the mirror aperture, i.e. opposite the well of the reflector.

In all cases, two masks 6 and 7 formed by opaque and non-reflecting strips are placed on either side of screen 3, and one edge of each of said masks lies in the plane containing the axes of revolution or close thereto (FIG. 1) or in the plane tangential to the source and passing through the corresponding axis of revolution, for example (FIG. 2).

Such dispositions ensure that the beam is cut-off with great sharpness and without parasite illumination above said cut-off line, irrespective of whether such illumination is due to diffraction on the screen edges, or to reflection or refraction within the lamp bulb or on the light source support. In FIG. 2, like components with reference to FIG. 1 are designated by like reference numerals followed by the subscript *a*.

However, the development of reflectors 1a and 2a above the plane containing the axes of revolution is more accentuated in order to collect thereat a greater amount of light. Since the images of filament 5 reflected off a reflector portion located above said angle would otherwise be seen above the desired cut-off line, this depthwise development is nevertheless limited by a certain angle, which may be termed the limiting angle of depthwise aperture in a vertical plane and is designated on the drawing by $\alpha$.

Figure 5:
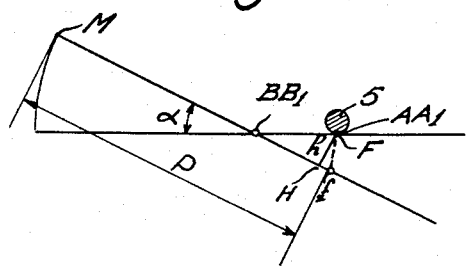
FIG. 5 is a geometrical diagram drawn in a vertical plane at right angles to the symmetry axis and passing through the focus of foci of the parabolic generating line or lines which lie in the cut-off plane.
Figure 6:
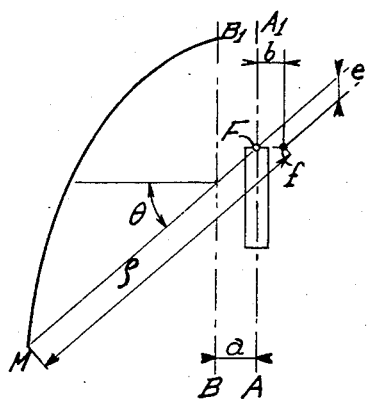
FIG. 6 is likewise a geometrical diagram drawn in a plane passing through one of the axes of revolution of the mirror but turned through a certain angle relative to said cut-off plane.
Figure 7:
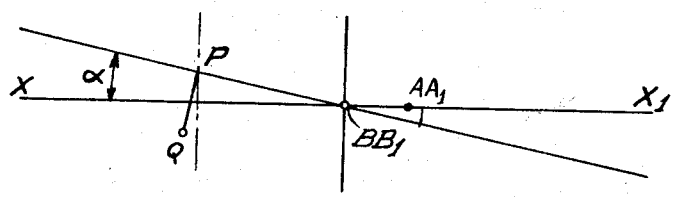
FIG. 7 shows a projection on a screen, in correspondence with FIGS. 5 and 6, said screen being formed by a surface perpendicular to the symmetry axis of the headlamp and spaced forwardly therefrom.

This limiting angle of depthwise aperture can be computed with reference to FIGS. 5 to 7.

Since filament 5 is horizontal and located tangential to axis $AA_1$ and immediately forward of the focus F common to the parabolic generating lines of the mirror, one may write:

$b = a - a \cos \alpha = a (1 - \cos \alpha)$
$h = a \sin \alpha$
$e = b \tan \theta$ where $a$ is the distance between one of the axes of revolution and the parallel axis containing focus F (FIG. 6),
$b$ the distance separating the circular locus $f$ of focus F on the plane $BB_1$ M (inclined at an angle $\alpha$ to the cut-off plane) from the rectangular projection of focus F on the same plane,
$h$ the distance between the projection H of focal point F on plane $BB_1$ M and the focal point F,
$e$ the distance between focal point $f$ and MF, as measured parallel to axis $BB_1$, and
$\theta$ the angle between a line perpendicular to axis $BB_1$ and the vector radius passing through the focal point F and the point M which is located both on the forward edge of the mirror and in the plane $BB_1$ M.

Referring now to FIG. 7, there is shown thereon a projection screen lying in a plane perpendicular to the headlamp axis $AA_1$ and forward thereof, on which the point Q is the image of the aforesaid point M and the point P the projection of point M on the plane of said screen, parallely to axis $AA_1$.

Since it is desired to eliminate from the mirror all points the images of which locate above a horizontal plane (represented on the screen by the horizontal line $XX_1$ intersecting the trace of axis $AA_1$), it is possible to write:

$$PQ = \frac{h}{\rho}$$

where $\rho$ is the distance between focal point $f$ and point M $$BP = \frac{e \cos \theta}{\rho}$$

to within a proportionality factor which is eliminated in the calculations which follow; furthermore, for point Q to be located beneath horizontal line $XX_1$, the following conditions must be satisfied:

$PQ \cos \alpha > BP \sin \alpha$ $\frac{h}{\rho} \cos \alpha > \frac{e \cos \theta}{\rho} \sin \alpha$ $h \cos \alpha > e \cos \theta \sin \alpha$ $a \sin \alpha \cos \alpha > b \tan \theta \cos \theta \sin \alpha$ $a \cos \alpha > (1 - \cos \alpha) \tan \theta \cos \theta$ $\frac{\cos \alpha}{1 - \cos \alpha} > \sin \theta$ Customary mirror apertures give $\theta$ angles of about 45°, so that $$\theta = \pm \frac{\pi}{4}$$

whence since $$\theta = \frac{\sqrt{2}}{2}$$

$$\frac{\cos \alpha}{1 - \cos \alpha} > \frac{\sqrt{2}}{2}$$

or $\cos \alpha > 0.413$, so that $\alpha < 65° 40'$.

This angle $\alpha$ is shown in FIG. 2 as being the maximum angle of depthwise aperture, so that those mirror portions which project beyond the two upper parabolas 8 and 9 can be dispensed with or rendered non-reflecting. By reason of the existence of screen 3a, the lower mirror portion receives no light and can if desired by symmetrically or approximately symmetrically restricted by parabolas 10 and 11 lying in a plane making an angle of $-\beta$ with the cut-off plane, and this angle can be chosen equal to angle $\alpha$ for reasons of symmetry, or different therefrom for any other reason.

There is thereby obtained a large mirror the aperture of which is roughly rectangular and which provides a light projection devoid of any images of filament 5 above the cut-off line $XX_1$.

Figure 3:
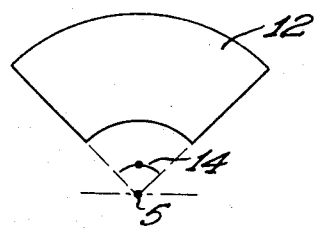
FIG. 3 is a front elevation view of the recuperating mirror.
Figure 4:
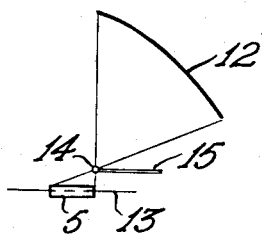
FIG. 4 is a sectional illustration, taken through the symmetry plane, showing the disposition of said recuperating mirror in relation to the focal point.

The upper part of this large mirror is nevertheless available for the insertion of an auxiliary optical system such as a small recuperating mirror. In order to ensure that such a recuperating mirror satisfies the conditions whereby no illumination is to appear above the cut-off line, said mirror 12 is disposed above filament 5, as shown in FIGS. 2 to 4. Mirror 12 is formed by a portion of a surface of revolution obtained by the rotation of a parabolic generating line about axis 13, and the generating line contained in the vertical plane, for example in the plane perpendicular to the cut-off plane, is a parabola the focus of which is located above and rearwardly of the rearmost section of the light source. This small mirror is therefore also located above and rearwardly of filament 5 and is limited to a relatively small angular sector.

The focal line 14 of said mirror 12 can be likened to a small circular arc concentric with the rearmost section of filament 5, the radius of which arc is equal to the distance betwene the filament axis, say, and the focus of the aforementioned parabola.

Rearwardly of said focal line 14 is disposed a complementary mask 15 the forward edge of which is located on said focal line, said mask being designed to stop all rays from filament 5 that would otherwise pass to the rear of said focal line.

In certain special cases wherein it is desired to obtain concentrated or spread lighting, axes $BB_1$ and $CC_1$ can be concurrent, divergent or convergent. Furthermore, axis $BB_1$ for instance could be displaced downwardly when it is desired to obtain an asymmetric cut-off. The marginal lines of said screen 3 can be straight or not. Similarly, instead of developing over the whole depth of the mirror, as shown in FIG. 1, said screen 3a could be restricted to a lesser depth and have a closed front portion, as illustrated in FIG. 2.

Of course, it will be understood that many other modifications can be made to the specific embodiments described hereinabove.

As an example, the lower part of the headlamp could likewise be provided with a mirror and second complementary mask recuperating system of the type hereinbefore disclosed. Such a mirror could be formed by the rotation of a parabola about the light source axis, with the focus of said parabola located appreciably beneath and somewhat forwardly of the front section of said source. The focal curve of this second recuperating mirror would similarly be a small circle concentric with the source axis, and a second complementary mask touching said focal line could be positioned forwardly thereof to stop such light rays issuing from the source as might otherwise pass forward of said focal line.

To such a mirror there would be associated an aperture in the lower part of screen 3.

Figure 8:
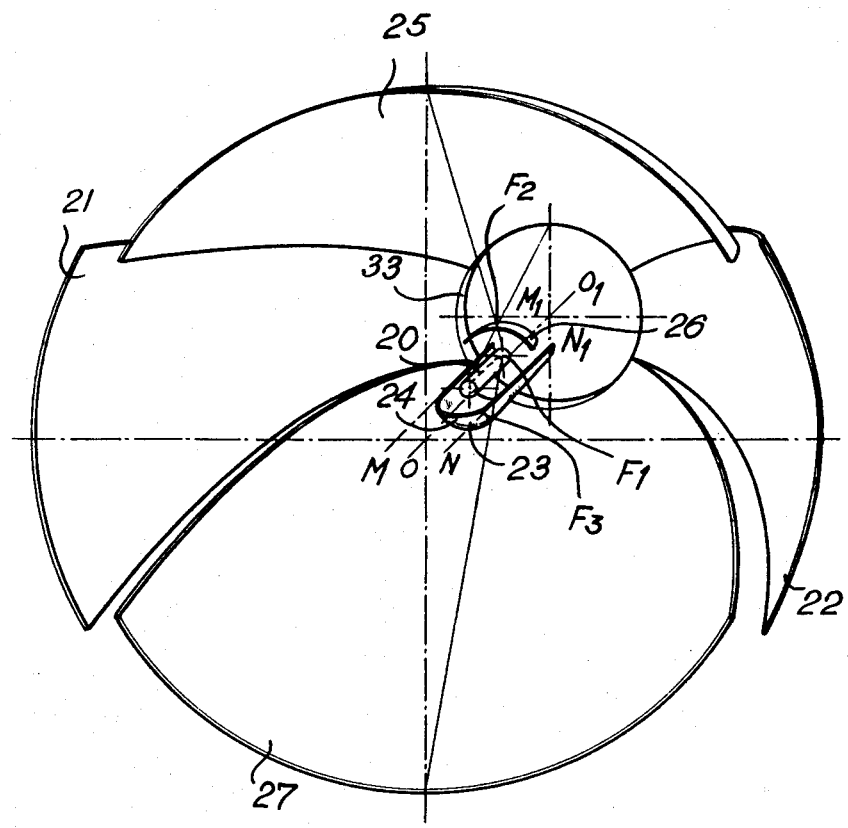
FIG. 8 is a schematic perspective view of the disposition of a light source, screens and reflectors in such a headlamp.

Reference is now had to FIG. 8 which shows a headlamp comprising, as hereinbefore described, a light source 20 consisting of a cylindrical circular-based element which can be regarded as an envelope for a spiral incandescent filament. Said cylindrical source 20 is arranged tangentially above an axis O, $O_1$. To said source are associated two side reflectors 21 and 22 the surfaces of which are bounded by homofocal parabolic generating lines. The common focus of these generating lines is a point $F_1$, located on axis O, $O_1$ in the immediate vicinity of the rearmost section of source 20. Said homofocal parabolas are contained in the boundary surface which, in the specific example described, is a plane that can be regarded as substantially horizontal. In the case of reflector 21, this parabolic generating line rotates about an axis M, $M_1$ parallel to axis O, $O_1$ and lying in the cut-off plane. Similarly, the parabolic generating line of reflector 22 rotates about an axis N, $N_1$ located symmetrically with axis M, $M_1$ relative to axis O, $O_1$.

To source 20 is associated an occultation cup 23 the edges of which intersect axes M, $M_1$ and N, $N_1$, said cup being positioned beneath said source.

The forward portion of cup 23 is bounded by a substantially quarter-spherical surface 24 which is in turn bounded by a circle lying in the plane containing the aforementioned axes.

For the same reasons as those discussed hereinbefore, the depthwise angle of aperture of reflectors 21 and 22 is limited above the cut-off surface and, more specifically for reasons of symmetry, the surface covered by said reflectors beneath said cut-off plane is made equal to the surface covered by the upper portions.

Said reflector is supplemented by an upper sector 25 which is generated in similar fashion to the recuperating mirror referred to precedingly. The surface of reflector 25 is obtained by the revolution of a half-parabolic generating line drawn in a plane passing through axis O, $O_1$ and perpendicular to the cut-off surface. Said semi-parabola has a focus $F_2$ located above the rearward portion of source 20. The parabola arc is limited by points $R_1$ and $S_1$, which are the intersections of said parabola with radii passing through focal point $F_2$ and respectively originating from the rear portion $f_1$ of source 20 and the forward extremity $f_2$ thereof. Said parabolic generating line rotates about the axis of revolution O, $O_1$.

An occultation screen 26 is disposed above and rearwardly of source 20 and is limited in front by a circular sector element which is the locus of focal point $F_2$ as it rotates about axis O, $O_1$.

Such a reflector unit is additionally provided with a lower recuperating reflector 27. This auxiliary reflector 27 is likewise obtained by means of a semi-parabolic generating line drawn in a plane which passes through axis O, $O_1$ and is likewise perpendicular to the cut-off surface. The corresponding parabola has focus $F_3$ positioned beneath the rear part of source 20. The useful parabolic sector is limited by points $R_2$, $S_2$ located at the extremities of said sector, on radii passing through point $F_3$ and drawn from the aforementioned points $f_1$ and $f_2$. This parabolic sector also rotates about axis O, $O_1$.

The lower auxiliary reflector 27 is illuminated through a window 28 embodied in the rear part of occulting cup 23, and the front part of said window is formed by a circular-sector line on which lies focal point $F_3$, said circular sector being the locus of said focal point in the generation of the lower auxiliary reflector 27.

Provision can also be made for supplementary screens adapted to mask the areas at which the various reflectors join together, in regard to the light source. The reflector unit as hereinbefore constructed has a substantially circular front aperture so that it can be associated to conventional fittings. The beam of light is cut-off very sharply and the shadow zone is the seat of no appreciable parasite illumination.

Reference is now had to FIG. 11, which represents a simplified embodiment wherein the mirror consists of a single surface of revolution. Such a mirror is accordingly generated by a parabolic sector 29 rotating about an axis $O_2$, $O_3$ and having a focus $F_4$ which does not lie on said axis. The focus $F_4$ is positioned above the rear part of a light source 30 shaped somewhat as a small cylindrical element the lowermost generating line of which is tangential to said axis. The extremities $R_3$, $S_3$ of parabolic segment 29 are located on radii passing through focus $F_4$ and through the forward and rear extremities $f_3$ and $f_4$ of source 30.

To source 30 there is associated a cup 31 which is of semi-cylindrical or like configuration and which is provided, on its side nearer the well of said reflector and hence on the same side as the end $f_4$ of source 30, with a hemispherical face 32 of radius equal to that of cylindrical element 31 and of which the semi-circular margin 33 lies on the circle described by focus $F_4$ in the process of generation of reflector 29. Such a cup can have any other shape provided that the straight and circular marginal edges referred to precedingly are retained.

In the two cases hereinbefore described with reference to FIGS. 8 to 11, the well of said reflector embodies a circular aperture rimmed by a flange 33 for adapting a bulb-holder. The bulbs utilized can therefore be of a type similar to those currently in use, with a substantially axial filament and occulting cups and screens within the bulb. Alternatively, the lamps can be non-conventional ones.

Figure 12:
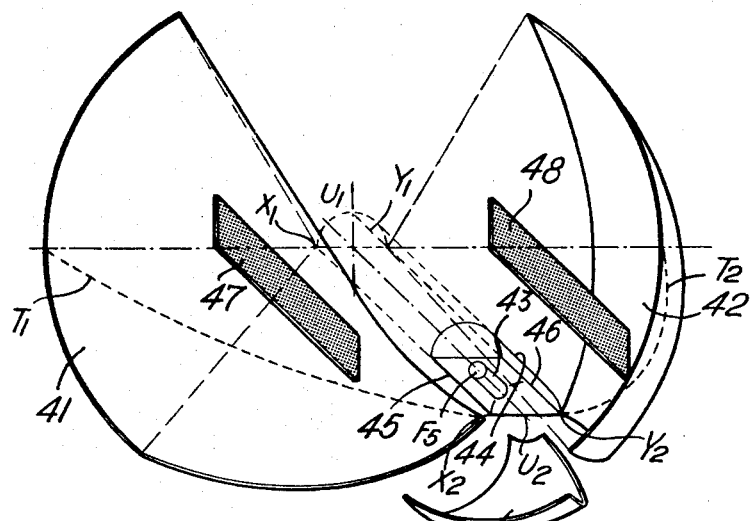
FIG. 12 is a perspective view of such a headlamp adapted to produce a divergent beam, as seen from in front and below.

Referring now to FIG. 12, the embodiment illustrated thereon comprises, as in the embodiments described precedingly, a reflector composed of two surfaces of revolution 41 and 42, of which the parabolic generating lines $T_1$ and $T_2$ lying in the cut-off plane form the two slopes of one and the same parabola having an axis $U_1$, $U_2$ and a focus $F_5$. The lefthand slope $T_1$, as viewed on FIG. 12, generates the mirror 41 by rotation about the axis $X_1$, $X_2$ parallel to axis $U_1$, $U_2$ and the righthand slope $T_2$ generates the mirror 42 by rotation about the axis $Y_1$, $Y_2$ parallel to axis $U_1$, $U_2$, said three axes $X_1$–$X_2$, $U_1$–$U_2$ and $Y_1$–$Y_2$ lying in the cut-off plane and said axes being furthermore equidistant from one another.

In the case of the divergent type of adjustment envisaged, the light source, which is a spiral filament 43 or like source and the geometrical envelope of which can be likened to a small cylinder element, is disposed coaxially with the centerline $U_1$, $U_2$, and the forward section of source 43, namely that remote from the mirror wells, is disposed at the focal point $F_5$.

A partial occulting screen 44 is placed above source 43 and the edges 45 and 46 of said screen lie along axes $X_1$, $X_2$ and $Y_1$, $Y_2$, respectively.

Two side masks 47 and 48 flank screen 44, being symmetrically spaced therefrom, and the lower edges of said masks lie in the cut-off plane, namely in the plane defined by the two parabolic slopes $T_1$ and $T_2$.

In a headlamp comprising the system of mirrors, screen and masks as hereinbefore described, it is possible to further dispose a small recuperating mirror 49 beneath source 43 and between the lower edges of the two principal mirrors 41 and 42.

To ensure that this recuperating mirror also satisfies the condition of not providing illumination above the cut-off line, said mirror 49 is arranged beneath source 43 (in the divergent form of adjustment). Said mirror 49 is formed by a portion of a surface of revolution obtained by the rotation of a parabolic generating line about the axis $U_1$, $U_2$ of source 43. This generating line 50 (see FIG. 14), lies in a plane perpendicular to the cut-off plane which may be vertical, say, and has a focus $F_6$ located beneath source 43.

A complementary mask 51 is preferably placed forward of said focus $F_6$ with its end section located thereat, in order to blank off any light rays that would otherwise pass in front of said focus and strike mirror 49.

Figure 15:
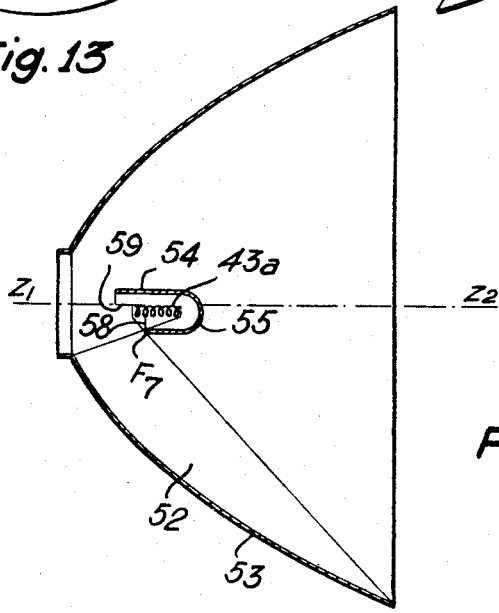
FIG. 15 is a schematic sectional view of an alternative embodiment equipped with a reflector of revolution, the section being taken through a plane perpendicular to the beam cut-off surface.

The method of construction shown in FIG. 15 is a simplified embodiment wherein mirror 52 is formed by a single surface of revolution generated by a parabolic arc 53 rotating about a single axis of revolution $Z_1$, $Z_2$, said parabolic arc having a focus $F_7$ that does not lie on said axis.

With a divergent form of adjustment, said focus $F_7$ of the lowermost parabolic generating line 53 of reflector 52 will be located beneath light source 43$a$. The upper part of light source 43$a$, which is positioned tangentially beneath axis $Z_1$, $Z_2$, is covered by a cup 54 which is semi-cylindrical over its rear portion and becomes cylindrical over its front portion, one extremity being closed by a hemisphere 55 to cut off any rays issuing from said light source and cast ahead of said focus $F_7$. To this end the semi-circular end section 58 of the cylindrical portion of cup 54 passes through focus $F_7$ and joins on to the generating lines 59 of the semi-cylindrical portion that lie in the cut-off surface passing through axis $Z_1$, $Z_2$.

Figures 13, 14:
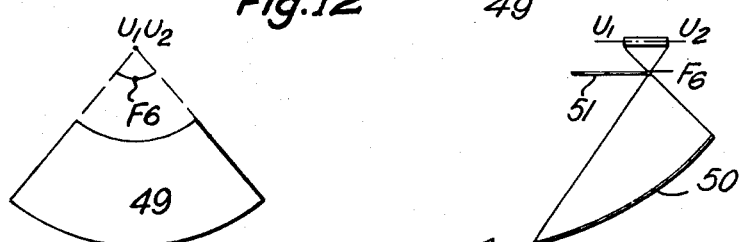
FIG. 13 is a front elevation view of the recuperating mirror.
FIG. 14 is a sectional view through the symmetry plane of the group of mirrors of FIG. 12, showing the disposition of the recuperating mirror relative to the focal point.

In FIGS. 16 and 17 there is shown a method of construction which comprises the components illustrated in FIGS. 12 to 14, namely two principal mirrors 41 and 42 associated to a lower recuperating mirror 49$a$ which is similar to mirror 49 but the span of which is larger. Said mirror 49$a$ is in fact enlarged so that it touches the lower edges of mirrors 41 and 42 and is bounded by an aperture curve 60 lying substantially in the same plane as the aperture curves of mirrors 41 and 42. The light source 43$b$, which can be likened to a small cylinder, can be so disposed that its uppermost generating line lies along axis $U_1$, $U_2$.

To such mirrors there is further associated an upper mirror 61 the span of which is such as to enable it to substantially join on to the upper edges of mirrors 41 and 42 and its aperture curve 62 to lie in the same plane as the aperture curves of mirrors 41 and 42.

The manner of generation of said upper mirror 61 is similar to that of lower recuperating mirror 49$a$, and the focus $F_8$ of generating parabola 63, which lies in a plane which passes through axis $U_1$, $U_2$ and is perpendicular to the cut-off surface, is located above the rear portion of source 43$b$. The focus of the parabolic generating line contained in the cut-off surface of mirrors 41 and 42 is positioned forward of source 43$b$, for example at point $F_9$ on axis $U_1$, $U_2$ in the case of a disposition similar to that described precedingly.

To such a set of mirrors there is associated a cup 44$a$ of identical definition as the aforementioned cup and a screen 51$a$ as hereinbefore described with reference to FIG. 13 and FIG. 14. Said cup and said screen can be joined together over their forward ends by an opaque element 64 shaped somewhat like a spherical cup and adapted to eliminate direct radiation from source 43$b$ and also such light rays as strike one or more of the mirrors and tend to produce converging beams. Said element 64 is located forward of focus $F_9$, in the same way that mask 51$a$ is located forward of focus $F_7$.

To allow for illumination of upper mirror 61, cup 44$a$ embodies a window bounded by edges 65. Said mirror stops slightly forward of focus $F_9$ and at the outermost limit of element 64, and its rear portion comprises a circular sector and section 66 which follows the locus of focal point $F_8$ in the course of generation of the mirror in question. Rearwardly of said end section 66, cup 44$a$ comprises a solid portion 67 which is bent towards the cut-off surface, being shaped somewhat like a niche and thereby partly masking the rearmost section of the light source.

Should it be desired to use a single light source to provide a cut-off beam alternating with a main beam, the cups, screens and masks hereinbefore described can be mounted on mobile supports adapted to allow them to be retracted if desired, and this can be achieved by any convenient means and more specifically by the means described in French Patent Number 1,296,036, filed in the applicant's name on 4th of May 1961, and entitled "Headlamp with double beams utilizing an axial source of light."

Alternatively, the system of cups, screens and masks can be comprised within an electric headlamp bulb similar to known conventional bulbs fitted with one or more filaments, or within similar light sources.

Similarly, the otherwise symmetrical cut-off (with reference to a vertical plane, say) could embody a distortion aimed at obtaining, in the case of divergently adjusted beams, a lighting of the so-called "European dipped beam" type, i.e. a form of lighting which comprises a set of light rays raised above the cut-off plane and directed towards the near side of the road along which a motor vehicle is driven.

When recourse is had to a light source formed by the lamp 70 shown in broken lines in FIG. 18, which lamp is a relatively long cylindrical lamp of non-negligible diameter, and when screens, masks or other stationary or mobile occulting means are rigid with the reflector, the operations of insertion or extraction of such a lamp through the well of the reflector are inseparable from the danger of knocking or displacing said cups, screens and masks and of consequently damaging or warping them. In order to avoid such damage, any risk of offering up lamp 70 obliquely or in an angularly incorrect position is prevented by barring, within reflector 71, the aperture 72 of the reflector well 73 (which aperture is surrounded by a supporting flange 74 for the bulb base 75) by means of a stirrup 76 the arms of which are rigidly connected to said well 72 and the web 77 of which is spaced from flange 74 and embodies an aperture 78 the contour of which matches the cross-sectional profile of the lamp and accessories it supports.

The guiding means provided thus prevent the lamp from being offered up obliquely or in an incorrect angular position, particularly during the final positioning phase, said base 75 co-operating with flange 74 to still further assist guiding.

It will of course be well understood by those skilled in the art that various changes and modifications may be made in the embodiments described hereinabove. By way of example, the optical systems described precedingly can be integrated into a "sealed beam" type of headlamp.

What I claim is:

1. In a headlamp having a cut-off beam limited by a boundary surface for dipped lighting on an automotive vehicle, in combination, a source of light, reflecting means constituted by at least a pair of lateral segments of reflecting surfaces of revolution, generated each by a corresponding sector of a parabolic line contained in said boundary surface of said beam, said sectors having a common focus disposed in the vicinity of said light source, said sectors being each geometrically rotated around respective corresponding distinct and fixed axes of revolution, externally disposed with respect to said common focus, and means for blocking the passage of at least a portion of the light generated by said light source and comprising a screen situated on one side of said source and having free edges substantially coinciding each with one of said axes of revolution.

2. In a headlamp according to claim 1, wherein said means for blocking light further comprises complementary masks situated on either side of said screen, said masks being opaque and non-reflecting strips symmetrically spaced with respect to said axes of revolution, each strip having an edge lying in a plane extending tangent to said source and containing a corresponding edge of said screen.

3. In a headlamp according to claim 1, wherein said reflecting surfaces of revolution are limited by parabolic generatrices contained in planes which are separated, with respect to said boundary surface, by a limiting angle of depthwise aperture.

4. In a headlamp according to claim 3, wherein said reflecting surfaces of revolution are limited, on either side of said boundary surface, by parabolic generatrices contained in planes symmetrically disposed with respect to said boundary surface.

5. In a headlamp according to claim 1, wherein said reflecting means further comprises a recuperating mirror disposed on the side of said light source opposite to said screen with respect to said boundary surface, said recuperating mirror being constituted as a sector of a reflecting surface of revolution, said sector having a geometric shape corresponding to the rotation of a parabolic generation curve situated in a plane substantially perpendicular to said boundary surface about an axis of revolution passing through said light source and having a geometrical focus situated externally of said light source, and an auxiliary mask situated on one side of the focal curve of said recuperating mirror and having an edge nearly touching said curve.

6. In a headlamp according to claim 1, wherein said reflecting means further comprises an auxiliary recuperating mirror disposed, with respect to said boundary surface, on the same side as said screen, said auxiliary recuperating mirror being constituted as a sector of a reflecting surface of revolution having a geometric shape generated by a parabolic generating line traced in a plane nearly perpendicular to said boundary surface and rotated around a geometrical axis extending through said source, said auxiliary mirror having a geometrical focus situated externally of said source, said screen having a window for illuminating from said source said auxiliary recuperating mirror, the headlamp further comprising a second auxiliary mask situated on one side of the focal curve of said auxiliary recuperating mirror and having an edge nearly touching said focal curve.

7. In a headlamp according to claim 1, wherein said light source is a cylindrical element of relatively small diameter and small length disposed with one of its extremities in the vicinity of said focus and situated with one of its rectilinear generatrices nearly in said boundary surface, said cylindrical element being located, with respect to said boundary surface, on the side opposed to that occupied by said scresen, said element being disposed forwardly of said common focus, said reflecting means further comprising a recuperating mirror disposed, with respect to said source, opposite said screen, said recuperating mirror being a sector of a reflecting surface of revolution geometrically formed by a parabolic generatrice traced in a plane nearly perpendicular to said boundary surface and having a geometrical focus situated externally of said source and on the same side as said recuperating mirror, in the vicinity of the rear part of said source, said generatrice being rotated around an axis of revolution nearly touching the rectilinear generatrice of said source which is the nearest line to said screen, said means for blocking light further comprising an auxiliary mask limited by a front edge touching the circle described by the geometrical focus of said parabolic generatrice in said recuperating mirror.

8. In a headlamp according to claim 1, wherein said light source is a cyindrical element of relatively small diameter and small length disposed with one of its extremities in the vicinity of said focus and situated with one of its rectilinear generatrices nearly in said boundary surface, said cylindrical element being located, with respect to said boundary surface, on the side opposed to that occupied by said screen, said element being disposed forwardly of said common focus, said reflecting means further comprising an auxiliary recuperating mirror disposed with respect to said boundary surface on the same side as said screen, said auxiliary recuperating mirror being constituted as a sector of a reflecting surface of revolution geometrically generated from a parabolic sector generation line traced in a plane nearly perpendicular to said boundary surface and rotated around an axis of revolution coincident with a rectilinear generatrice of said light source which is nearest to said screen, said parabolic generation line having a geometrical focus external of said source, in the vicinity of the rear part of said source and on the side near said screen, a window in said screen for illuminating by said source said auxiliary recuperating mirror, said window having a front edge touching the circular line described by said geometrical focus in the course of its rotation.

9. In a headlamp according to claim 1, wherein said light source is constituted as a cylindrical element of relatively small diameter and small length disposed with one of its extremities in the vinicity of said focus and situated with one of its rectilinear generatrices nearly in said boundary surface, said cylindrical element being located with respect to said boundary surface, on the side opposed to that occupied by said screen, said element being disposed beneath said common focus, said reflecting means further comprising a recuperating mirror disposed on the side of said light source which is opposed to said screen with respect to said boundary surface, said recuperating mirror being constituted as a sector of a reflecting surface of revolution geometrically generated from a parabolic sector generation line traced in a plane perpendicular to said boundary surface, having a geometrical focus externally disposed with respect to said source and on the same side as said recuperating mirror, in the vicinity of the rear part of said source, said generation line being rotated around an axis of revolution nearly touching a rectilinear generatrice of said source which is the nearest line to said screen, said, means for blocking light further comprising an auxiliary mask limited by a rear edge touching the circle described by the geometrical focus of said parabolic generatrice of said recuperating mirror.

10. In a headlamp according to claim 1, wherein said light source is constituted as a cylindrical element of relatively small diameter and small length disposed with one of its extremities in the vicinity of said focus and situated with one of its rectilinear generatrices nearly in said boundary surface, said cylindrical element being located, with respect to said boundary surface, on the side opposed to that occupied by said screen, said element being situated rearwardly with respect to said common focus, said reflecting means further comprising an auxiliary recuperating mirror disposed with respect to said boundary surface on the same side as said screen, said auxiliary recuperating mirror being constituted as a reflecting surface of revolution geometrically generated by a parabolic sector generation line traced in a plane nearly perpendicular to said boundary surface and rotated around a revolution axis nearly touching a rectilinear generatrice of said source which is the farthest line from said screen, said parabolic sector generation line having a geometrical focus situated externally with respect to said source and in the vicinity of the rear part of said source in the region opposite to that occupied by said screen, and a window in said screen for illuminating by said source said auxiliary recuperating mirror, said window having a rear edge touching the circular line described by said geometrical focus in the course of its rotation.

11. In a headlamp according to claim 10, wherein said screen having the window is joined by an opaque member surrounding the front part of said source to the front part of an auxiliary mask the rear edge of which mask touches the circle described by the geometrical focus in the course of its rotation of a parabolic generation line of a recuperating mirror traced in a plane nearly perpendicular to said boundary surface, said focus being situated externally with respect to said source and being on the same side as said recuperating mirror, in the vicinity of the rear part of said source.

12. In a headlamp according to claim 1, wherein said axes of revolution are co-planar.

13. In a headlamp according to claim 1, wherein said axes of revolution are parallel.

14. In a headlamp according to claim 1, wherein said axes of revolution are situated in two distinct planes.

15. In a headlamp according to claim 1, wherein one of the edges of said screen is distinctly situated from one of said revolution axes.

References Cited by the Examiner
UNITED STATES PATENTS

| | | | |
|---|---|---|---|
| 1,280,626 | 10/18 | Ames | 240—41.25 |
| 1,306,511 | 6/19 | Ames | 240—41.37 |
| 1,525,234 | 2/25 | Graham | 240—46.01 |
| 1,912,487 | 6/33 | Matera | 240—41.35 |
| 2,106,533 | 1/38 | Nielsen | 240—41.37 |

FOREIGN PATENTS

| | | |
|---|---|---|
| 621,109 | 5/61 | Canada. |
| 527,896 | 8/21 | France. |
| 1,224,680 | 2/60 | France. |

NORTON ANSHER, *Primary Examiner.*